US007331198B1

(12) United States Patent
Yamakawa et al.

(10) Patent No.: US 7,331,198 B1
(45) Date of Patent: Feb. 19, 2008

(54) BENDING APPARATUS FOR A GLASS SHEET

(75) Inventors: Hiroshi Yamakawa, Flueurus (BE); Junji Tanaka, Aiko-gun (JP); Toshimi Yajima, Chita-gun (JP); Masahiro Tsuchiya, Chita-gun (JP); Masaaki Konishi, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 313 days.

(21) Appl. No.: 09/831,913

(22) PCT Filed: Sep. 22, 2000

(86) PCT No.: PCT/JP00/06518

§ 371 (c)(1),
(2), (4) Date: May 10, 2002

(87) PCT Pub. No.: WO01/23310

PCT Pub. Date: Apr. 5, 2001

(30) Foreign Application Priority Data

Sep. 27, 1999 (JP) .................................. 11-272805

(51) Int. Cl.
*C03B 32/00* (2006.01)
*C03B 23/00* (2006.01)
(52) U.S. Cl. .............................. 65/274; 65/287; 65/290
(58) Field of Classification Search .......... 65/273–275, 65/287, 290
See application file for complete search history.

(56) References Cited

U.S. PATENT DOCUMENTS

| 4,505,671 | A | * | 3/1985 | McMaster | 432/144 |
| 5,122,180 | A | * | 6/1992 | Mathivat et al. | 65/162 |
| 5,173,102 | A | | 12/1992 | Weber et al. | |
| 5,437,704 | A | * | 8/1995 | Yli-Vakkuri et al. | 65/107 |
| 5,656,052 | A | * | 8/1997 | Boardman et al. | 65/103 |
| 5,876,477 | A | * | 3/1999 | Bennett et al. | 65/273 |
| 6,347,535 | B2 | * | 2/2002 | Kamata | 65/29.19 |

FOREIGN PATENT DOCUMENTS

| DE | 2 158 812 | | 6/1972 |
| DE | 691 05 297 | | 6/1995 |
| EP | 0 058 529 | | 8/1982 |
| EP | 0 443 947 | | 8/1991 |
| EP | 0 443 948 | | 8/1991 |
| EP | 0 486 952 | | 5/1992 |
| EP | 0 592 862 | | 4/1994 |
| EP | 0 659 697 | | 6/1995 |
| EP | 0 928 779 | | 7/1999 |
| GB | 836560 | * | 6/1960 |
| KR | 10-0214109 | | 5/1999 |

* cited by examiner

*Primary Examiner*—Carlos Lopez
(74) *Attorney, Agent, or Firm*—Oblon, Spivak, McClelland, Maier & Neustadt, P.C.

(57) ABSTRACT

A desired temperature distribution is efficiently formed on a glass sheet by a simple structure without lowering heat efficiency within a furnace. A heating furnace conveys a bending mold of a glass sheet and a radiation-heating device is provided in the heating furnace. A first group of a plurality of heating elements are fixed on an inner wall surface of the heating furnace. A second group of a plurality of heating elements are disposed separably from an inner wall surface of the heating furnace.

15 Claims, 5 Drawing Sheets

F I G. 4
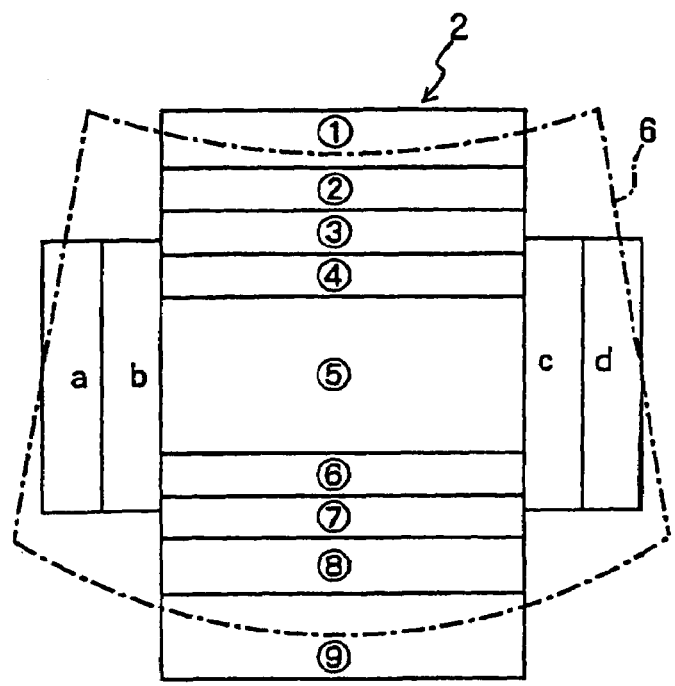
F I G. 5
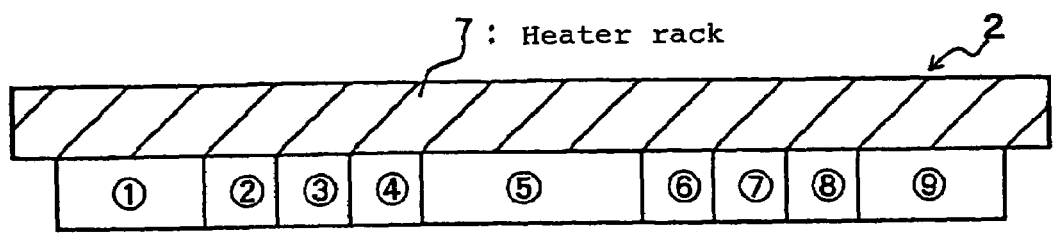

BENDING APPARATUS FOR A GLASS SHEET

TECHNICAL FIELD

The present invention relates to a bending apparatus for at least one glass sheet to bend a glass sheet into a desired shape at a high accuracy and a method of bending at least one glass sheet.

BACKGROUND ART

When bend-forming a window glass for an automobile, at least one glass sheet cut into a predetermined size and shape is placed on a ring-like bending mold, and is stayed in a plurality of heating sections for a predetermined time in a bending zone of a heating furnace, and is conveyed into the next heating section in order, and is heated to a bending temperature (usually about 550 to 650° C.) of at least one glass sheet. Thus, the glass sheet is bended in accordance with the shape of the bending mold by self-weight.

In such a bending process of at least one glass sheet, it is necessary for obtaining a desired shape to accurately control a temperature distribution of the glass sheet at a high reproducibility. When at least one glass sheet is bended under a uniform temperature condition by placing on a ring-like bending mold, it is known that the central part of the glass sheet between frame parts at both ends of the bending mold sags and the sectional shape of the central line of the glass sheet becomes a flat pan bottom shape at the sagged part, or becomes a shape, the central part of which is somewhat lifted. In order to make a shape of aimed design, it is necessary to maintain the peripheral zone of the glass sheet at a low temperature and the central part of the glass sheet at a high temperature, thereby forming a trapezoidal temperature distribution.

In a bending process of a glass sheet, it is known to form a temperature distribution on a glass sheet. For example, it is known to employ a method of placing a locally heating device faced to the side portions of a glass sheet in order to locally largely bend the side portions of the glass sheet. However, to locally heat the side portions of a glass sheet is a technical idea different from locally heating the central portion other than deformed portions in order to prevent deformation of the peripheral portion of the glass sheet.

On the other hand, there is known a glass molding apparatus provided with a heat-shielding plate to shield a bending mold for placing at least one glass sheet from heat in order to obtain such a temperature distribution as to make the temperature of the central part higher than the temperature on both ends of the glass sheet as mentioned above.

DISCLOSURE OF THE INVENTION

However, this conventional molding apparatus provided with a heat-shielding plate is so complicated in respect of its structure as to disturb automatic conveyance of at least one glass sheet. Further, since the heat-shielding plate is fixed to a bending mold, a tensile stress is produced during cooling step in a zone of at least one glass sheet-placed portion of right above the heat-shielding plate, thereby lowering a strength of the glass sheet. Also, since the heat-shielding plate has a heat capacity which becomes a load to heating, it is hard to heat the whole within a furnace to such a high temperature as to be required for bending because heating energy is not efficiently used. As this result, a time required for bending is increased, and productivity is lowered.

In order to solve such a problem, JP-A-7-277754 proposes a method for obtaining a desired temperature distribution by providing a shield at appropriate position and height between heating elements, thereby limiting a heating range of the heating elements.

However, this method requires many shields to be provided depending on shapes of individual products, and is therefore hardly widely usable. Also, it is necessary to move many shields up and down respectively independently depending on the shapes of products, and it is therefore necessary to provide a plurality of elevating mechanisms which make the total structure very complicated. Also, in such a case, to provide shields other than heating means makes an obstacle to raising the whole part within a furnace to a satisfactorily high temperature, and heating energy is not efficiently used, thus lowering heat efficiency.

The present invention has been made by taking the above conventional techniques into consideration, and an object of the present invention is to provide a bending apparatus of simple structure capable of efficiently forming at least one glass sheet into a desired shape at a high accuracy by forming a satisfactory temperature distribution on the glass sheet without lowering heat efficiency within a furnace.

In order to achieve the above object, the present invention provides a bending apparatus for bending at least one glass sheet placed on a bending mold into a desired shape by heating in a furnace, which comprises a bending mold for placing at least one glass sheet thereon, a tunnel-like heating furnace through which the bending mold is conveyed, a first group of a plurality of heating elements fixed on an inner wall of the heating furnace, and a radiation-heating device having a second group of a plurality of heating elements placed separably from the inner wall surface of the heating furnace.

Further, the present invention provides a method of bending at least one glass sheet into a desired shape, which comprises placing at least one glass sheet on a bending mold, introducing the glass sheet placed on the bending mold into a heating furnace having a tunnel-shaped inside, and heating the glass sheet by two types of heating means of a first group of a plurality of heating elements fixed on an inner wall surface of the heating furnace and a second group of a plurality of heating elements placed separably from the inner wall surface of the heating furnace.

According to this structure, the whole part within the heating furnace can be maintained at a satisfactory heat-bending temperature by a first group of heating elements, and at least one glass sheet can be efficiently heated from a position closer to the glass sheet separated from the inner wall surface of the furnace by a second group of heating elements. Thus, by efficiently using each heating element, its heating energy can be used efficiently for bending the glass sheet without loss.

In this case, the first group of heating elements are fixed and supported at the ceiling side or floor side of the heating furnace by means of an appropriate mounting plate or supporting bracket or the like, and are thus firmly fixed on the inner wall surface of the furnace to provide a heating device. On the other hand, the second group of heating elements constitutes a separate heating device separated from the inner wall surface of the heating furnace.

A preferable structure example includes the second group of heating elements which radiation-heat locally a predetermined position of at least one glass sheet to provide a predetermined temperature distribution on the glass sheet.

According to this structure, the whole part within a furnace is heated by the first group of heating elements, and at least one glass sheet is locally heated by means of the second group of heating elements placed at a position closer to the glass sheet than the first group of heating elements to form a required satisfactory temperature distribution on the glass sheet. By this manner, at least one glass sheet can be locally heated by efficiently using heat energy to provide a desired temperature distribution on the glass sheet.

The second group of heating elements are composed of a plurality of heating elements, each of which can control its heating temperature, and the second group of heating elements can be placed close to at least one glass sheet in such a manner as to form a desired temperature distribution on the glass sheet by radiation heat from each heating element (if the heating elements are placed too part from the glass sheet, the whole part of the glass sheet is uniformly heated and a satisfactory temperature distribution cannot be provided). By selectively using each heating element of the second group of heating elements, a heating temperature can be controlled and a desired temperature distribution can be provided on the glass sheet. Also, by using the second group of a plurality of divided heating elements, it is possible to adjust a temperature depending on a size of a glass sheet employed, thus enabling a wide applicability.

A further preferable structure example includes the second group of heating elements suspended from the ceiling inner wall of the heating furnace in such a manner as to be opposed to the upper surface of at least one glass sheet.

According to this structure, it is possible to place the second group of heating elements close to the glass sheet by means of a simple structure without changing the structure of a bending mold and without adversely affecting the structure or movement of the conveying system.

Also, a further preferable structure example comprises the second group of heating elements placed at a variable distance from the inner wall surface of the heating furnace.

According to this structure, it is possible to vary a distance between at least one glass sheet and each heating element of the second group of heating elements. By this manner, it is possible to adjust a radiation-heat amount and to simply and accurately form a desired temperature distribution on the glass sheet by varying a position to be locally heated and a heating temperature depending on a material or shape of the glass sheet.

Also, a further preferable structure comprises the second group of heating elements, each of which has a heater wire and an equally heating plate provided on the heating surface of the heater wire.

According to this structure, it is possible to accurately control a temperature by equally imparting radiation-heat from each heating element to at least one glass sheet. Thus, the heater wire constituting a heating element is not exposed to at least one glass sheet but an equally heating plate is provided between the heater wire and the glass sheet. In this manner, a temperature is controlled by the surface temperature of the equally heating plate. By using the equally heating plate, an extreme local heating by the heater wire can be avoided, and a desired temperature distribution can be formed on the glass sheet without damaging the glass sheet.

Also, by using such an equally heating plate, each heating element can provide a uniform temperature face, and accordingly each heating element can be easily controlled by a computer and deformation analysis of at least one glass sheet can be easily made by means of finite element method, thus enabling to previously fix a temperature of each of individual heating elements.

As mentioned above, in order to achieve the above object, a radiation-heating device employed in the present invention comprises a first group of heating elements fixed to an inner wall surface of a heating furnace and a second group of heating elements divided into each heating element in the vicinity of at least one glass sheet in the furnace, and a desired temperature distribution can be provided on at least one glass sheet by selectively employing each heating element or by adjusting its fixed temperature of each heating element. In such a case, the second group of heating elements for providing a temperature distribution are preferably individually divided and disposed along such a direction as to form a desired temperature distribution on at least one glass sheet. For example, when a heating device is prepared by arranging heating elements of longitudinal shape in a row and the heating device thus prepared is applied to preparation of a window glass for an automobile, heating elements are disposed so as to put the longitudinal direction of each heating element along the direction vertical to the center line of at least one glass sheet (width direction of a glass sheet) in the vicinity of the central part of the glass sheet. Also, in the central part of the side periphery, in order to control a bending depth of at least one glass sheet, the heating elements are disposed so as to put the longitudinal direction of each heating element in the direction parallel to the centerline of at least one glass sheet (see the following FIG. 4).

BRIEF DESCRIPTION OF THE DRAWINGS

FIG. 4 is a structure view illustrating still another example of a radiation-heating device used in the present invention.

FIG. 5 is a sectional view illustrating an example of a radiation-heating device used in the present invention.

BEST MODE FOR CARRYING OUT THE INVENTION

Hereinafter, the embodiments of the present invention are explained with reference to the drawings.

Figure 1:
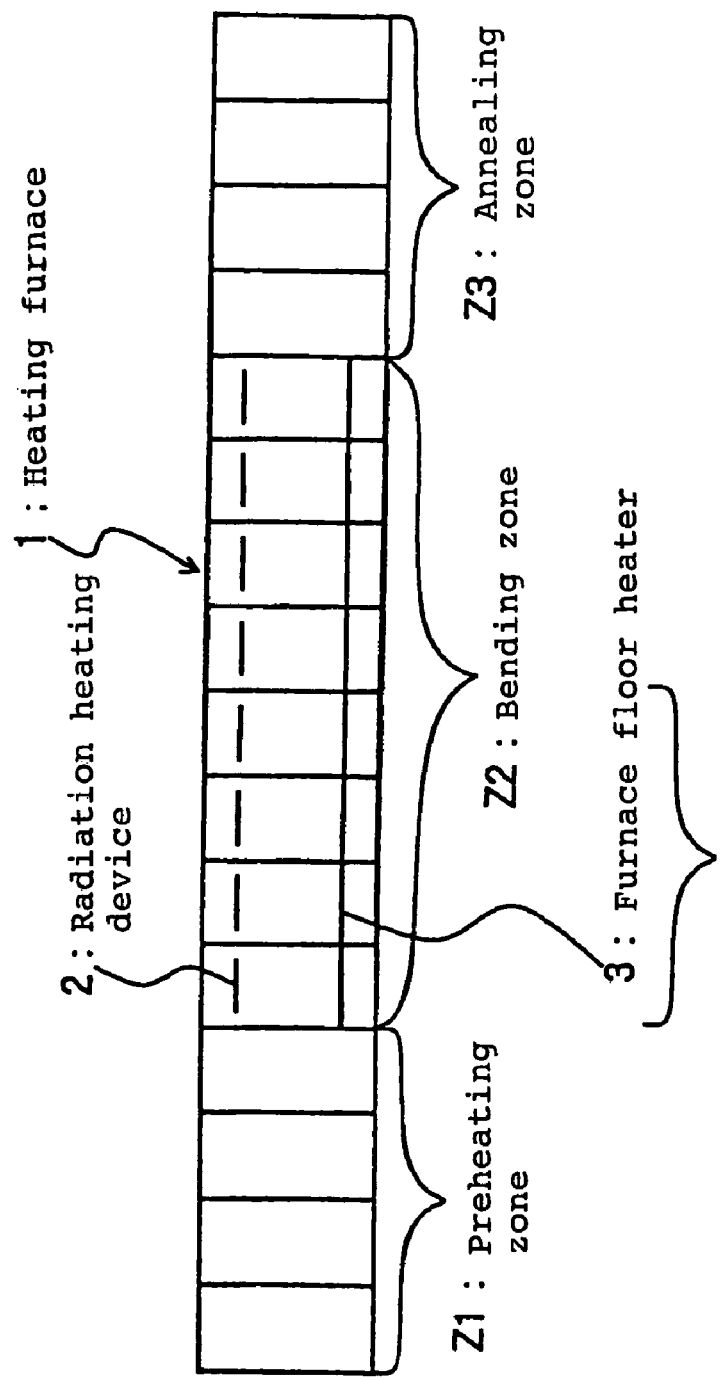
FIG. 1 is a general structure view illustrating a bending apparatus for at least one glass sheet employed in the present invention.

FIG. 1 is a general structure view illustrating a bending apparatus for at least one glass sheet concerning an embodiment of the present invention.

A tunnel-like heating furnace 1 comprises a preheating zone Z1, a bending zone Z2 and a annealing zone Z3. Each zone comprises a plurality of sections (in this example, the preheating zone comprises 4 sections, the bending zone comprises 8 sections and the annealing zone comprises 4 sections). A conveyer (not shown) is provided through the preheating zone Z1, the bending zone Z2 and the annealing zone Z3, and a bending mold (not shown) having at least one glass sheet placed thereon is conveyed through a heating furnace by the conveyer. In the bending zone Z2, a ceiling heater (not shown), a floor heater 3 and a side wall heater (not shown) are provided respectively on the ceiling, floor and side wall of the heating furnace 1. Each of the ceiling heater, the floor heater and the side wall heater comprises a plurality of heating elements fixed on an inner wall surface of the heating furnace 1 by an appropriate fixing and supporting means. These ceiling heater, floor heater and side wall heater heat the whole part within a furnace, and constitute a first group of heating elements of the present invention.

A divided radiation-heating device 2 of the present invention is provided on the upper side of a conveyer (not shown) of each section of the bending zone Z2 in such a manner as to be separated from the ceiling inner wall of the heating furnace. The radiation-heating device 2 constitutes a second group of heating elements of the present invention.

The bending mold comprises a ring having a shape curved so as to almost corresponds to an aimed bending shape of the periphery of at least one glass sheet as the main constituting element.

After cutting a glass sheet into a predetermined shape, one or two or more glass sheet is placed on the bending mold and heated to about 500° C. in the preheating zone Z1. Thereafter, the glass sheet is heated so as to form a desired temperature distribution thereon in the bending zone Z2, and is bended into a shape in conformity with the shape of the bending mold by self-weight. The glass sheet is then slowly cooled in the annealing zone Z3.

The bending mold having the glass sheet placed thereon is conveyed so as to intermittently stop at each section in the heating furnace 1. A desired temperature distribution is formed on at least one glass sheet by the radiation-heating device (second group of heating elements) of the present invention while staying in a section in order in the bending zone Z2 in the furnace. The temperature distribution becomes an aimed temperature distribution when the bending mold is stayed in the final section of the bending zone Z2, and the glass sheet is bended into a desired shape by self-weight.

Figure 2:
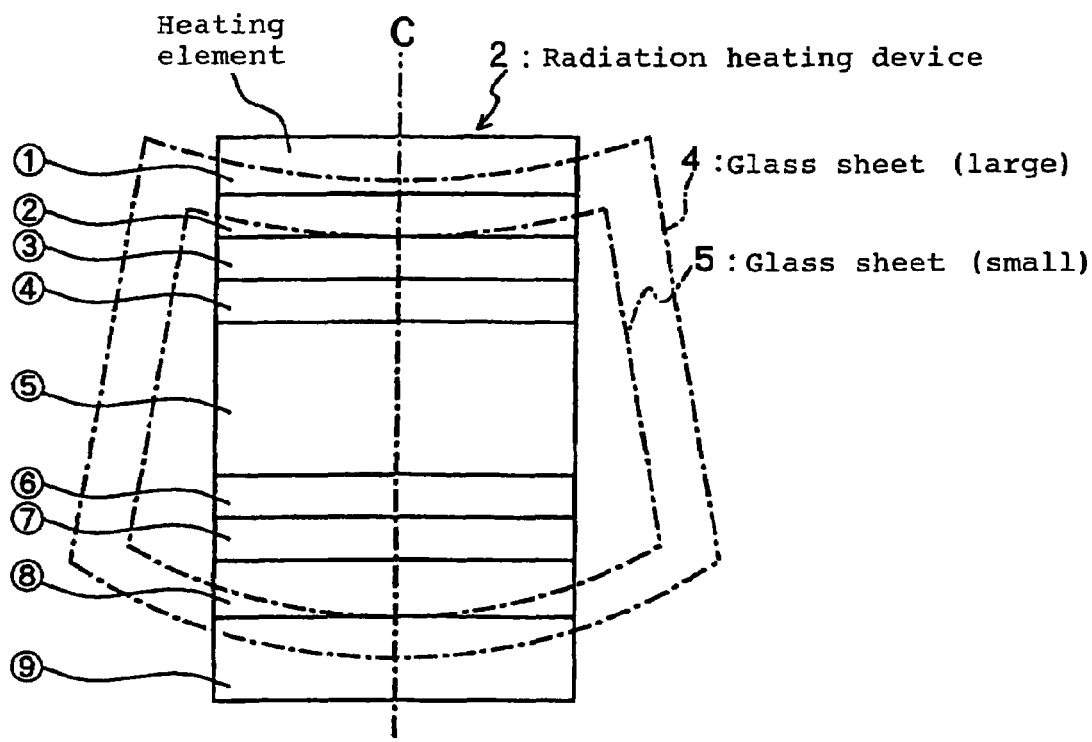
FIG. 2 is a structure view illustrating an example of a radiation-heating device used in the present invention.

FIG. 2 is a structure view illustrating an example of a radiation-heating device 2 (second group of heating element) provided in the heating furnace of FIG. 1.

A plurality of heating elements of longitudinal shape (nine elements in this example) ① to ⑨ are disposed in a row to form a radiation-heating device 2. Each of the heating elements ① to ⑨ is disposed in the left and right direction of the central part of the glass sheet 4 or 5 of forming a window glass for an automobile in such a manner as to put the longitudinal direction of each element in the vertical direction (horizontal direction) of the center line C of the glass sheet 4 or 5. By this manner, a temperature distribution is formed depending on a radiation heat from each heating element along the center line C of the glass sheet 4 or 5. The radiation-heating device 2 is provided in the vicinity of the upper side of the glass sheet in the bending zone Z2 of the heating furnace 1. The floor heater 3 is provided on the lower side of the glass sheet. The floor heater 3 also comprises a plurality of divided heating elements in the same manner as in the radiation-heating device 2 provided on the upper side of the glass sheet, and this is preferable for forming a temperature distribution at a higher accuracy. In this case, a distance between the glass sheet and the radiation-heating device 2 is adjusted so as to be capable of forming an aimed temperature distribution by each heating element, and is in the range of about 50 to 250 mm. A surface temperature of each heating element of the radiation-heating device 2 is controlled individually depending on each heating element in each section.

A bending mold having at least one glass sheet placed thereon can be accurately stayed at a predetermined position of each section in the furnace. The deepest position of the section of a glass sheet to be bended is determined by a position relationship between a radiation-heating device 2 and a glass sheet 4 or 5. When a windshield glass of an automobile is designed so as to be smoothly connected with a roof part, the most deeply bended position of the section of the windshield glass is on the upper part (upper part of the windshield glass mounted on a car body). In the case of such at least one glass sheet, a temperature distribution having a higher temperature at the upper part of the glass sheet can be easily formed by adjusting a position of stopping the bending mold having the glass sheet placed thereon and a temperature of each heating element depending on disposition of the radiation-heating device 2 shown in FIG. 2.

Figure 3:
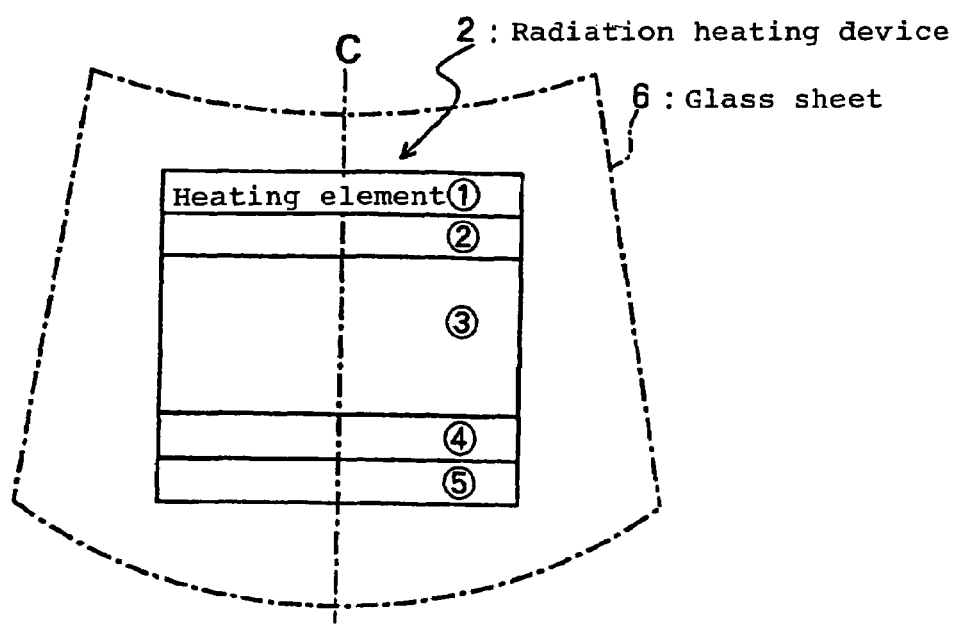
FIG. 3 is a structure view illustrating another example of a radiation-heating device used in the present invention.

FIG. 3 is a structure view illustrating another embodiment of a radiation-heating device 2 of the present invention.

This embodiment comprises a radiation-heating device 2 having five heating elements ① to ⑤ placed along the center line C in the central part of the inner side of a glass sheet 6.

FIG. 4 is a structure view illustrating still another embodiment of a radiation-heating device of the present invention.

This embodiment comprises two heating elements a and b and two heating elements c and d respectively provided on the left side and the right side of heating elements ① to ⑨ in the central part in addition to the radiation-heating device illustrated in the above FIG. 2 in order to form a temperature distribution on both side parts in the left and right direction (width (car width) direction of a window glass for an automobile) of a glass sheet 6.

FIG. 5 is a sectional view illustrating an example of a radiation-heating device 2.

In this example, each of heating elements ① to ⑨ is provided on a heater rack 7 in such a manner as to make the height of the lower side face (heat-radiating face) of each heating element constant. The heater rack 7 is supported separably from the ceiling inner wall of a heating furnace.

Figure 6:
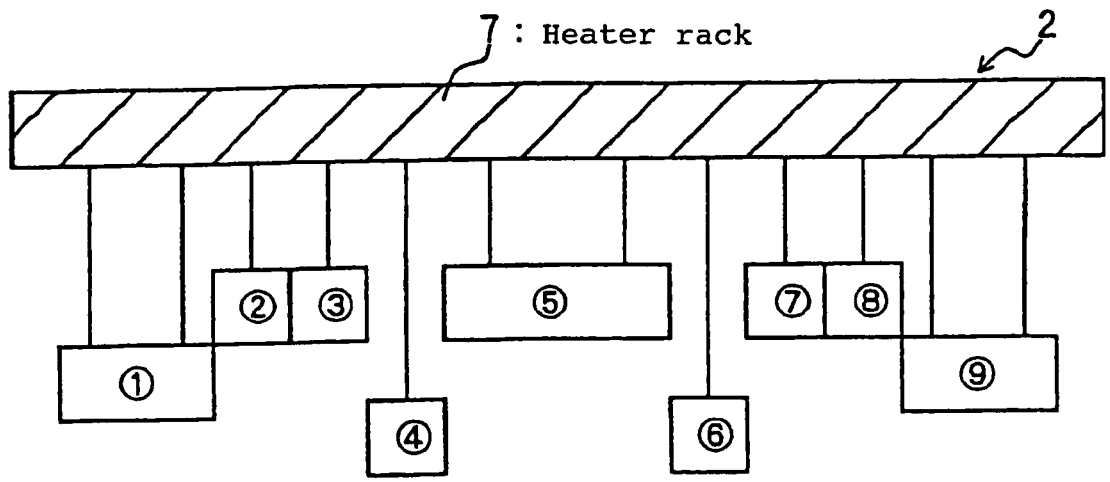
FIG. 6 is a sectional view illustrating another example of a radiation-heating device used in the present invention.

FIG. 6 is a sectional view illustrating an embodiment wherein the disposition of each of the heating elements ① to ⑨ of the radiation-heating device 2 shown in FIG. 5 is changed.

In this example, a height of each of heating elements ① to ⑨ on the heater rack 7 is made variable, and each height of each heating element is variable as compared with the embodiment illustrated in FIG. 5. By adjusting the height of each heating element depending on an aimed temperature distribution to be formed on at least one glass sheet, the aimed temperature distribution can be more accurately formed. By adjusting the height of each heating element depending on an aimed shape of at least one glass sheet to be bended, a desired temperature distribution can be formed on at least one glass sheet having various shapes. Also in this example, the heater rack 7 is supported separably from the ceiling inner wall of the heating furnace in the same manner as in the example of FIG. 5.

Figure 7:
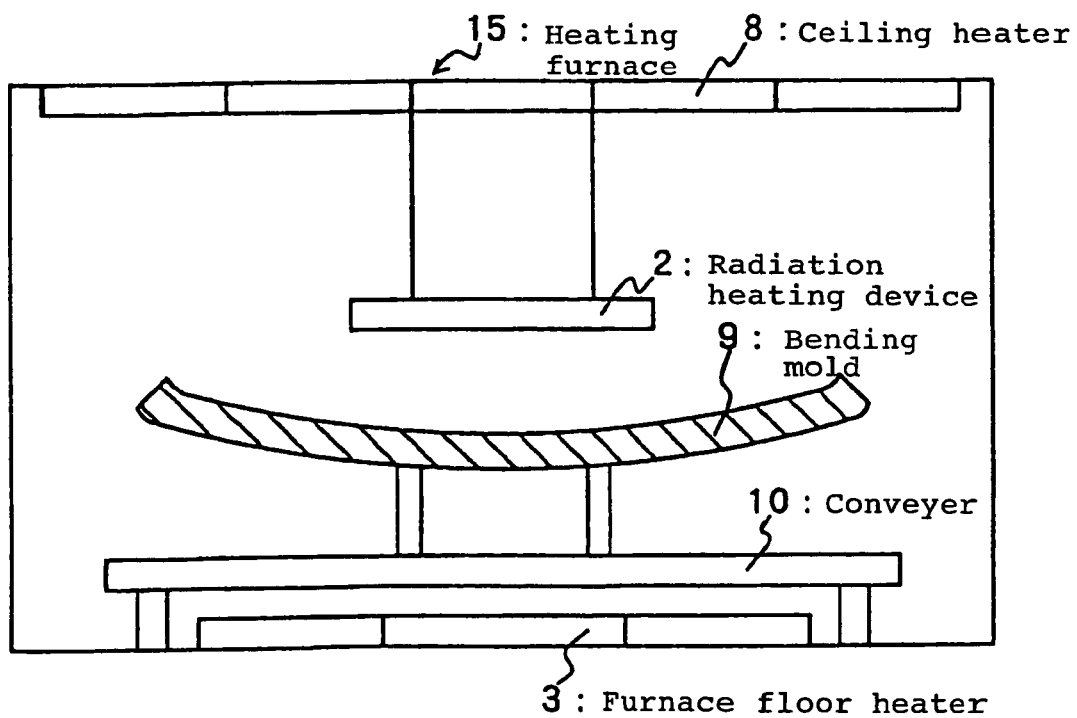
FIG. 7 is a structure view of the inside of a furnace illustrating an example of a bending apparatus of the present invention.

FIG. 7 is a structure view of an inner part of a furnace illustrating an example of a bending apparatus of the present invention.

As shown in this Figure, a ceiling heater 8 is provided on the ceiling of a heating furnace 15 (bending zone Z2 in FIG. 1). Also, a conveyer 10 is provided through each zone Z1, Z2 and Z3 in the heating furnace (see FIG. 1), and a bending mold 9 is conveyed. At least one glass sheet (not shown) is placed on the bending mold 9. A floor heater 3 is provided under the conveyer 10. In this manner, a first group of heating elements comprises the ceiling heater 8 and the floor heater 3. A radiation-heating device 2 (a second group of heating elements) is suspended in the vicinity above at least one glass sheet (not shown) on the bending mold 9. In this case, the ceiling heater 8 on the back side of the radiation-heating device 2 may be selectively used without using all of them.

Figure 8:
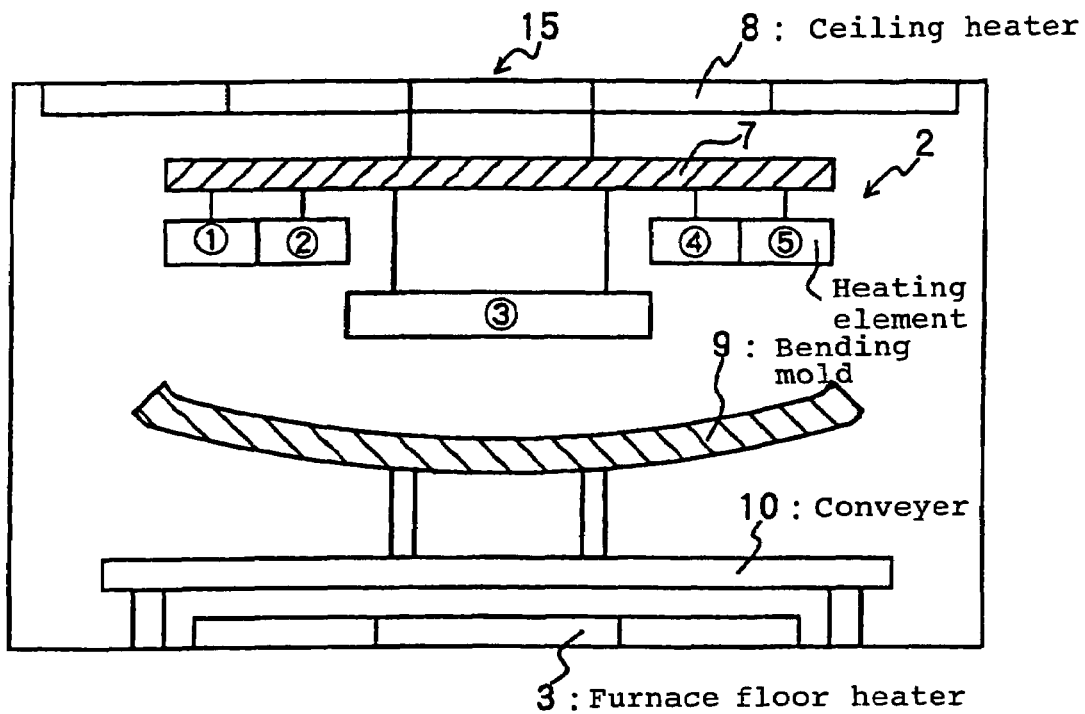
FIG. 8 is a structure view of the inside of a furnace illustrating another example of a bending apparatus of the present invention.

FIG. 8 is a structure view of an inner part of a furnace illustrating another example of a bending apparatus of the present invention. In this example, a radiation-heating device 2 comprising heating elements ① to ⑤ having various heights provided on a heater rack 7 is suspended from the ceiling of a furnace as a radiation-heating device in the same manner as in the example of FIG. 6.

Figure 9:
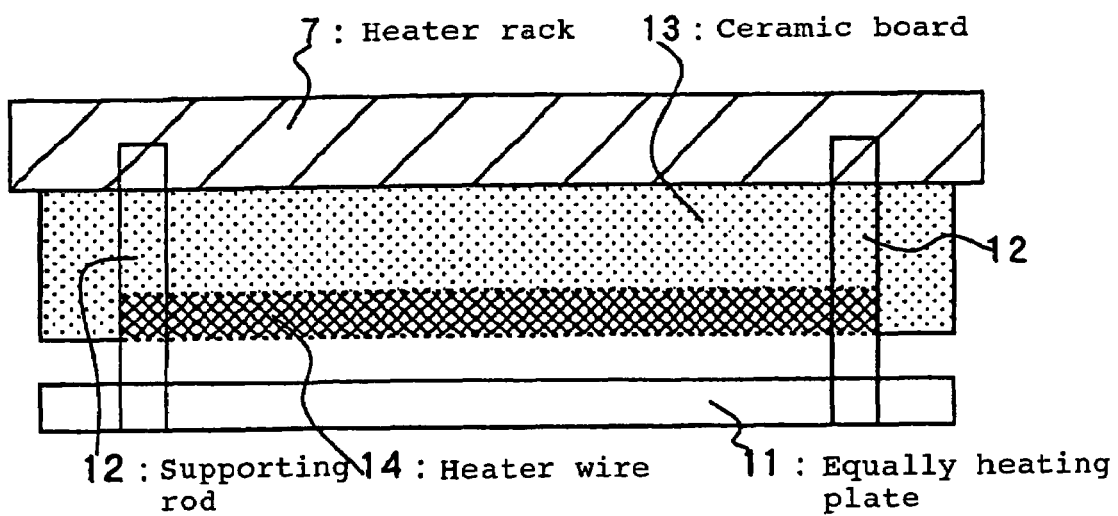
FIG. 9 is a sectional view illustrating a preferable structure of a heating element used in the present invention.

FIG. 9 is a sectional view illustrating a preferable structure of a heating element.

A ceramic board 13 is provided on the lower side of a heater rack 7, and a heater wire 14 is embedded within the ceramic board 13. An equally heating plate 11 is fixed on the heater rack 7 by a supporting rod 12 so as to cover the lower side of the heater wire 14. By providing the equally heating plate 11, heat from the heater wire 14 makes a temperature within the equally heating plate equal, and a uniform radiation heat from each heating element can be applied to at least one glass sheet, thereby enabling to control a temperature distribution at a high accuracy. In place of using such an equally heating plate 11, a heating element having a temperature-controlling heating face may be used to control a temperature of the heating surface.

INDUSTRIAL APPLICABILITY

As explained above, according to the present invention, at least one glass sheet can be satisfactorily bended by effectively using each heating element, i.e. by maintaining a satisfactory heat-bending temperature in the whole part in a heating furnace by a first group of heating elements fixed on an inner wall surface of the heating furnace and by efficiently heating the glass sheet by a second group of heating elements provided at a position close to the glass sheet but apart from the inner wall surface of the furnace.

Also, it is possible to efficiently form a desired temperature distribution on at least one glass sheet at a high accuracy by a simple structure having a heating device comprising a plurality of temperature-controlling heating elements provided close to the glass sheet so as to be capable of forming a temperature distribution on the glass sheet by radiation heat from each heating element. By this manner, a glass sheet to be bended can be efficiently heated in conformity with its shape, and the accuracy of bending can be raised and productivity can be improved.

The invention claimed is:

1. A bending apparatus for bending at least one glass sheet placed on a bending mold into a desired shape by heating in a furnace, which comprises a bending mold for placing at least one glass sheet thereon, a tunnel-like heating furnace through which the bending mold is conveyed, a first group of a plurality of heating elements fixed on an inner wall of the heating furnace, and a radiation-heating device having a second group of a plurality of heating elements placed separably from the inner wall surface of the heating furnace, wherein said second group of a plurality of heating elements of said radiation-heating device are mounted on a heater rack disposed in the furnace, wherein the heater rack may be moved to increase or decrease the distance between said second group of a plurality of heating elements and said glass sheet, wherein said second group of a plurality of heating elements comprises five or more heating elements, and wherein the temperature of each heating element of said second group of a plurality of heating elements may be individually controlled.

2. The bending apparatus for at least one glass sheet according to claim 1, wherein the second group of heating elements radiation-heat locally at least one glass sheet at a predetermined position to provide a predetermined temperature distribution on the glass sheet.

3. The bending apparatus for at least one glass sheet according to claim 1, wherein the second group of heating elements are suspended from a ceiling inner wall of the heating furnace at a position opposed to the upper surface of the glass sheet.

4. The bending apparatus for at least one glass sheet according to claim 1, wherein a distance between the second group of heating elements and the inner wall surface of the heating furnace is variable.

5. The bending apparatus for at least one glass sheet according to claim 1, wherein each heating element of the second group of heating elements has a heater wire and an equally heating plate provided at the heating face side of the heater wire.

6. The bending apparatus for at least one glass sheet according to claim 2, wherein the second group of heating elements are suspended from a ceiling inner wall of the heating furnace at a position opposed to the upper surface of the glass sheet.

7. The bending apparatus for at least one glass sheet according to claim 2, wherein a distance between the second group of heating elements and the inner wall surface of the heating furnace is variable.

8. The bending apparatus for at least one glass sheet according to claim 2, wherein each heating element of the second group of heating elements has a heater wire and an equally heating plate provided at the heating face side of the heater wire.

9. The bending apparatus for at least one glass sheet according to claim 3, wherein a distance between the second group of heating elements and the inner wall surface of the heating furnace is variable.

10. The bending apparatus for at least one glass sheet according to claim 3, wherein each heating element of the second group of heating elements has a heater wire and an equally heating plate provided at the heating face side of the heater wire.

11. The bending apparatus for at least one glass sheet according to claim 4, wherein each heating element of the second group of heating elements has a heater wire and an equally heating plate provided at the heating face side of the heater wire.

12. The bending apparatus for at least one glass sheet according to claim 1, wherein said second group of a plurality of heating elements of said radiation-heating device are disposed along the center line of said glass sheet.

13. The bending apparatus for at least one glass sheet according to claim 1, wherein said second group of a plurality of heating elements of said radiation-heating device are disposed two-dimensionally.

14. A bending apparatus for bending at least one glass sheet placed on a bending mold into a desired shape by heating in a furnace, which comprises a bending mold for placing at least one glass sheet thereon, a tunnel-like heating furnace through which the bending mold is conveyed, a first group of a plurality of heating elements fixed on an inner wall of the heating furnace, and a radiation-heating device having a second group of a plurality of heating elements placed separably from the inner wall surface of the heating furnace, wherein said second group of a plurality of heating elements of said radiation-heating device are mounted on a heater rack that may be moved to increase or decrease the distance between said second group of a plurality of heating elements and said glass sheet, wherein said second group of a plurality of heating elements are mounted on said heating rack in a direction generally parallel to the direction of the at least one glass sheet as it moves through the furnace, and wherein the temperature of each heating element of said second group of a plurality of heating elements may be individually controlled.

15. The bending apparatus for at least one glass sheet according to claim 14, wherein the height of each heating element of the second group of heating elements is separably adjustable.

* * * * *